United States Patent
Mrowiec et al.

(10) Patent No.: US 12,483,605 B2
(45) Date of Patent: Nov. 25, 2025

(54) SYSTEM AND METHOD FOR RESOURCE ARBITRATION FOR COMMERCIAL OFF THE SHELF PHONES

(71) Applicant: MOTOROLA SOLUTIONS, INC., Chicago, IL (US)

(72) Inventors: Robert Mrowiec, Liszki (PL); Madhusudan Pai, Frisco, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/999,069

(22) PCT Filed: Sep. 30, 2020

(86) PCT No.: PCT/PL2020/050072
§ 371 (c)(1),
(2) Date: Nov. 17, 2022

(87) PCT Pub. No.: WO2022/071815
PCT Pub. Date: Apr. 7, 2022

(65) Prior Publication Data
US 2023/0224338 A1    Jul. 13, 2023

(51) Int. Cl.
*H04L 65/1046*    (2022.01)
*H04L 65/1069*    (2022.01)
*H04L 65/1083*    (2022.01)

(52) U.S. Cl.
CPC ...... *H04L 65/1046* (2013.01); *H04L 65/1069* (2013.01); *H04L 65/1083* (2013.01)

(58) Field of Classification Search
CPC .................. H04L 65/1046; H04L 65/1069
See application file for complete search history.

(56) References Cited

U.S. PATENT DOCUMENTS

| 6,909,719 B1 * | 6/2005 | Petersson ................ H04L 47/70 370/395.42 |
| 10,039,151 B1 * | 7/2018 | Upp ..................... H04L 9/0844 |

(Continued)

FOREIGN PATENT DOCUMENTS

| WO | 2008102311 A2 | 8/2008 |
| WO | 2012092706 A1 | 7/2012 |

OTHER PUBLICATIONS

The International Search Report and the Written Opinion corresponding patent application No. PCT/PL2020/050072 filed: Sep. 30, 2020, all pages.

*Primary Examiner* — Jason D Recek

(57) ABSTRACT

A method is provided. The method includes receiving, at an arbitration server, a call setup request, the call setup request including at least an indication of an application used to send the call setup request and at least one other indication of a call type of a call associated with the call setup request. The method includes retrieving, from a configuration database, a call priority associated with the call set up request. The method includes determining that the user device is currently engaged in an ongoing call associated with an ongoing call priority. The method includes determining that the call setup request is of higher priority than the ongoing call based on the ongoing call priority. The method includes when the call setup request is of higher priority, terminating the ongoing call and completing the setup of the call associated with the call setup request.

20 Claims, 5 Drawing Sheets

(56) References Cited

U.S. PATENT DOCUMENTS

| | | |
|---|---|---|
| 2007/0280210 A1 | 12/2007 | Milstein et al. |
| 2012/0020252 A1* | 1/2012 | Bouthemy ............ H04W 88/16 370/328 |
| 2012/0173726 A1 | 7/2012 | Zajac et al. |
| 2012/0263125 A1 | 10/2012 | Tejaswini et al. |
| 2018/0041350 A1* | 2/2018 | Karlsson ............. H04L 65/1016 |
| 2018/0054767 A1* | 2/2018 | Gholmieh ......... H04W 36/0022 |
| 2019/0068785 A1* | 2/2019 | Cañas ................ H04L 65/1016 |

* cited by examiner

SYSTEM AND METHOD FOR RESOURCE ARBITRATION FOR COMMERCIAL OFF THE SHELF PHONES

BACKGROUND

Currently available mobile phone operating systems may limit the use of certain resources to one application at a time. For example, in the Android™ mobile phone operating system, the use of the microphone resource is limited to one application at a time. This may be acceptable when there is generally only one application that utilizes the resource at a time. For example, many mobile devices only have a single voice application (e.g. Voice Over Long Term Evolution (VoLTE)) that utilizes the microphone resource, such that there is not a possibility of conflicting use of the microphone resource.

A problem may arise when there are multiple applications that are in contention for use of the resource. For example, there may be multiple voice applications such as VoLTE, Voice over Internet Protocol (VoIP), secure VoIP (SVoIP), Mission Critical Push to Talk (MCPTT), etc., that may all contend for use of the microphone resource. Further exacerbating the problem may be the fact each voice application may provide for calls of differing priority, such that a simple rank ordering of applications to determine which one is granted access to the resource is not sufficient. For example, VoLTE and MCPTT may both offer emergency calls and 1-1 calls. The priority order may be VoLTE (emergency)>MCPTT (emergency)>VoLTE (1-1)>MCPTT (1-1). A simple rank ordering of applications, that does not take into account call priority type, would be insufficient.

To alleviate this problem, a mobile device manufacturer may include an arbitration function, which may also be referred to as an interaction framework (IF). The IF may provide an application programming interface (API) through which each application may request use of a resource such as a microphone. The IF may then determine which application should be granted access to the resource and passes that request on to the device's operating system. The IF is aware of the various applications that may utilize the resource, the type of calls the application may make, as well as the relationship between the priorities of the applications and the various call types. If a given application has control of the resource and the IF determines that an application with a higher priority should be granted the resource, the IF may preempt the current application. Thus, the IF controls which application is granted access to the resource at any given time.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
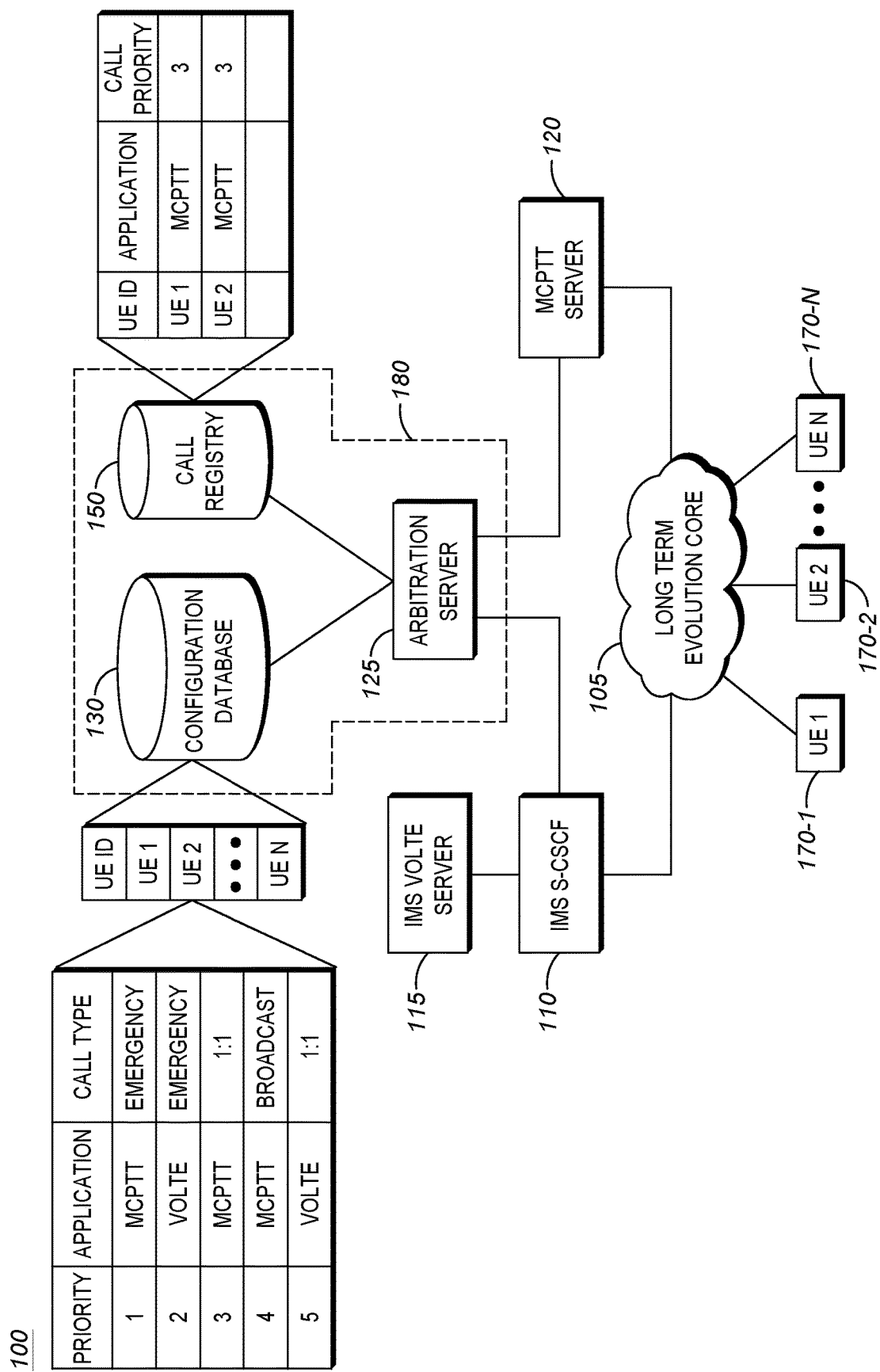
FIG. 1 is a block diagram of an example system that may implement the resource arbitration for commercial off the shelf phones techniques described herein when the arbitration server is implemented as a standalone service.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The use of the IF resolves the problem that many mobile phone operating systems only allow for granting access to a resource by a single application, with no possibility for preemption. Thus, the IF allows for multiple applications that utilize the same resource to run concurrently, with the IF determining which application has access to the resource at any given time.

A problem arises in that the IF is developed by the mobile device provider. In today's world, organizations are increasing shifting to a bring your own device (BYOD) model, in which members of the organization supply their own device to be used, with little to no restrictions on those devices. The organization must assume that members may choose readily available, commercial of the shelf (COTS) mobile devices from any number of different device providers. As such, the organization cannot assume that an IF of any type is available on the mobile device. Even if an IF of some type is available, the implementation of the IF of one mobile device provider cannot be guaranteed to operate the same as the IF of a different mobile device provider (e.g. mechanism to determine priority of application/call type may be completely different and result in completely different prioritization). Furthermore, because there would be no standardization between IFs from different device providers, the applications would need to be modified to be compatible with every possible IF that may be included on a BYOD device.

The techniques described herein overcome this problem and others, individually and collectively by introducing an arbitration server (AS) into the network infrastructure. The AS has access to configurable definitions of priority of applications and call types, such that the network operator has control over the priority order. The AS keeps track of all currently ongoing calls to all users. Upon origination of a new call, the AS determines if any parties involved in the call are currently engaged in an ongoing call. Depending on the application and priority of the ongoing call as well as the application and priority of the new call, the AS may preempt the ongoing call to allow the new call to proceed. Otherwise the AS may reject the new call. Upon completion of an ongoing call, the AS may update its data to indicate the parties involved in the completed call are no longer engaged in a call.

Because the AS is implemented within the network infrastructure, there is no need for an IF to be implemented on the user's mobile device. As such, the user is able to utilize any COTS mobile device, without restriction because all call prioritization and preemption decisions are made in the network, not on the mobile device itself. Furthermore, the techniques described herein may be implemented in several different places in the network infrastructure, depending on the specific architecture of the infrastructure. Although the AS is referred to as a server, it should be understood that this does not necessarily mean the AS is implemented as a separate computing platform. In many cases, the functionality of the AS may be executed on an existing platform or may be integrated into the functionality of other services.

Further advantages and features consistent with this disclosure will be set forth in the following detailed description, with reference to the appended figures.

A method for resource arbitration for a user device including a plurality of applications is provided. The method includes receiving, at an arbitration server, a call setup request, the call setup request including at least an indication of an application used to send the call setup request and at least one other indication of a call type of a call associated with the call setup request. The method also includes retrieving, from a configuration database associated with the arbitration server, a call priority associated with the call set up request. The method further includes determining that the user device is currently engaged in an ongoing call, the ongoing call associated with an ongoing call priority. The method additionally includes determining, based on the retrieved call priority, that the call setup request is of higher priority than the ongoing call based on the ongoing call priority. The method also includes when the call setup request is of higher priority, terminating the ongoing call and completing the setup of the call associated with the call setup request.

In one aspect the resource is a microphone of the user device. In one aspect, the method further comprises, when the call setup request is not of higher priority, rejecting the call setup request. In one aspect, the method further comprises receiving, at the arbitration server, the call setup request as a result of initial filter criteria performed on the call set up request. In one aspect, the method further comprises receiving, at the arbitration server, the call setup request from one of the plurality of applications.

In one aspect, the method further comprises receiving, at the arbitration server, all call setup requests. In one aspect, the call priority is based on the application of the plurality of applications and a call type associated with the call set up request. In one aspect, the plurality of applications includes at least one of: Voice Over Long Term Evolution (VoLTE), Video Over Long Term Evolution (ViLTE), Mission Critical Push to Talk (MCPTT), Mission Critical Video (MCVideo), Voice Over Internet Protocol (VoIP), and Secure VoIP (SVoIP). In one aspect, the arbitration server is a standalone server. In one aspect, the arbitration server is integrated within a Internet Multimedia Subsystem (IMS) Serving Call Setup and Control Function (S-CSCF).

A non-transitory processor readable medium containing a set of instructions thereon is provided. The instructions, when executed by a processor, cause the processor to receive, at an arbitration server, a call setup request, the call setup request including at least an indication of an application used to send the call setup request and at least one other indication of a call type of a call associated with the call setup request. The instructions further cause the processor to retrieve, from a configuration database associated with the arbitration server, a call priority associated with the call set up request. The instructions further cause the processor to determine that a user device is currently engaged in an ongoing call, the ongoing call associated with an ongoing call priority. The instructions further cause the processor to determine, based on the retrieved call priority, that the call setup request is of higher priority than the ongoing call based on the ongoing call priority. When the call setup request is of higher priority, the instructions further cause the processor to terminate the ongoing call and complete the setup of the call associated with the call setup request.

In one aspect, when the call setup request is not of higher priority, the instructions on the medium further cause the processor to reject the call setup request. In one aspect, the instructions on the medium further cause the processor to receive, at the arbitration server, the call setup request as a result of initial filter criteria performed on the call set up request. In one aspect, the instructions on the medium further cause the processor to receive, at the arbitration server, the call setup request from one of a plurality of applications. In one aspect, the instructions on the medium further cause the processor to receive, at the arbitration server, all call setup requests.

A system is provided. The system includes a processor and a memory coupled to the processor. The memory contains a set of instructions thereon that when executed by the processor cause the processor to receive, at an arbitration server, a call setup request, the call setup request including at least an indication of an application used to send the call setup request and at least one other indication of a call type of a call associated with the call setup request. The instructions further cause the processor to retrieve, from a configuration database associated with the arbitration server, a call priority associated with the call set up request. The instructions further cause the processor to determine that a user device is currently engaged in an ongoing call, the ongoing call associated with an ongoing call priority. The instructions further cause the processor to determine, based on the retrieved call priority, that the call setup request is of higher priority than the ongoing call based on the ongoing call priority. When the call setup request is of higher priority, the instructions further cause the processor to terminate the ongoing call and complete the setup of the call associated with the call setup request.

In one aspect, when the call setup request is not of higher priority, the instructions on the memory further cause the processor to reject the call setup request. In one aspect, the instructions on the memory further cause the processor to receive, at the arbitration server, the call setup request as a result of initial filter criteria performed on the call set up request. In one aspect, the instructions on the memory further cause the processor to receive, at the arbitration server, the call setup request from one of a plurality of applications. In one aspect, the instructions on the memory further cause the processor to receive, at the arbitration server, all call setup requests.

FIG. 1 is a block diagram of an example system that may implement the resource arbitration for commercial off the shelf phones techniques described herein when the arbitration server is implemented as a standalone service. System 100 includes a Long Term Evolution (LTE) Core network 105, an Internet Multimedia Subsystem (IMS) Serving Call Session Control Function (S-CSCF) 110, an IMS VoLTE server 115, an MCPTT server 120, an arbitration server 125, and User Equipment (UE) 170-1 . . . n.

The LTE Core network 105 is one example of a radio access network (RAN) that allows UE (described in further detail below) to access services and applications provided by the IMS and other application providers. Although shown as an LTE network, it should be understood that an LTE Core network is only one type of transport network that can connect UE to applications and services. Other examples can include both wired and wireless networks, such as WiFi, Bluetooth, Ethernet, $2^{nd}$ generation cellular networks, $3^{rd}$ generation cellular networks, etc. It should be understood that the techniques described herein are not dependent on any particular type of transport network and may be utilized with any transport network capable of allowing UE to communicate with application servers. In other words, the techniques described herein are not limited to an LTE core network.

The Internet Multimedia Subsystem (IMS) is an architectural framework defined by the $3^{rd}$ Generation Partnership Project (3GPP) to deliver IP Multimedia services to devices such as UE. The IMS includes many different elements related to UE authentication and authorization. For purposes of the present description, only the IMS S-CSCF 110 is shown. The purpose of the IMS S-CSCF 110 is to provide call session control. For example, all call signaling that is destined for calls served by the IMS system will be routed via the IMS S-CSCF 110 and those signaling messages may be examined.

The 3GPP has defined a format for describing control logic that is referred to as initial Filter Criteria (iFC). The iFC may be accessible to the IMS S-CSCF 110 and may instruct the IMS S-CSCF 110 to forward a given message to a specific application server upon receipt of the message. For example, an iFC may be defined that states upon receipt of a Session Initiation Protocol (SIP) Invite message at the IMS S-CSCF 110, the SIP Invite should be forwarded to another application server (e.g. the AS 125) prior to being processed by the IMS S-CSCF. The iFC may also require that the IMS S-CSCF 110 wait for a response from the application server prior to processing the SIP Invite message. Operation of the iFC will be described in further detail below with respect to FIG. 2.

System 100 may also include a IMS VoLTE server 115. The IMS VoLTE server 115 may allow UE to place voice calls via LTE. In some cases, the IMS VoLTE server may be owned and operated by the owner of the LTE Network 105 or by the owner and operator of the IMS network. The techniques described herein are not dependent on any particular type of owner/operator relationship. What should be understood is that the VoLTE service is provided to the UE by the IMS VoLTE server 115. What should be further understood is that VoLTE is only one example of a service that is provided by the IMS. Other services (not shown) may also be provided. Examples of such services could include VoIP, SVoIP, Video over LTE (ViLTE), etc. What should be understood is that the IMS system may provide any number of services, including any number of services related to voice communication.

System 100 may also include a Mission Critical Push to Talk (MC PTT) server 120. The MC PTT server 120 may provide mission critical push to talk services as defined by the 3GPP. In the example shown in FIG. 1, the MC PTT server 120 is not part of the IMS system, and as such, calls utilizing the MC PTT server do not go through the IMS S-CSCF server 110. Instead, the UE 170 may be directly aware of the MC PTT server 120 and send call initiation messages directly to the MC PTT server. Although an MC PTT server 120 is mentioned, it should be understood that this is merely a representative example of an application that may run outside the structure of the IMS system.

An application service that runs outside the IMS may be configured to provide functionality similar to the iFC. For example, upon any call initiation request, the application server may be configured to send the SIP Invite message to the AS 125. Just as with the iFC, the application server may be configured to wait for a response from the AS 125 before proceeding to process the SIP invite message. Just as with the VoLTE server 115, the application server may be owned by the operator of the LTE core 105, the operator of the IMS, or any other party. The particular ownership structure of the system is relatively unimportant.

System 100 may include arbitration server 125, coupled to configuration database 130 and call registry 150, which may collectively be referred to as the arbitration server function (ASF) 180. Although three elements are specified, it should be understood that this is for purposes of explanation only and is not intended to imply that three separate devices are required. Rather, each of the elements may be considered a piece of functionality and that functionality can be provided with any combination of different hardware and software. For example, all elements of the ASF may be combined into a single entity. As another example, the configuration database 130 and the call registry 150 may be combined into a single data storage system or may reside in separate storage systems. What should be understood is that the techniques described herein are not dependent on any particular implementation of the ASF 180.

As will be explained in further with respect to FIG. 2, the arbitration server 125 may receive all indications of call initiations and terminations. For example, in the case of an IMS system based call (e.g. VoLTE, etc.), the iFC may cause the SIP Invite message, which is used to initiate calls, to be directed to the arbitration server 125. In case of a call application that is not IMS based (e.g. non IMS based MC PTT, etc.), the application itself is modified to forward all call initiation messages, regardless of protocol being used, to the arbitration server 125.

The arbitration server 125 may be coupled to a call registry 150. The call registry 150 may be a database that stores the status of every piece of UE 170 that is currently engaged in a call. As shown, the call registry may include a UE identifier (UE ID) that identifies a particular piece of UE 170 that is currently engaged in a call. The call registry may also include an indication of the application type that is currently in use by the UE (e.g. VoLTE, MC PTT, etc.). The call registry 150 may also include a call priority, which is explained in further detail below. Although a specific implementation for the call registry 150 data structure is described, it should be understood that this is for purposes of description only and not by way of limitation. What should be understood is that ASF 180 has the ability to determine if a particular piece of UE 170 is currently engaged in a call, and if so, what the priority of that call is.

Arbitration server 125 may also be coupled to configuration database 130. In one implementation, configuration database 130 may be first indexed by UE ID. As shown, each piece of UE 170 in the system 100 may include an entry in the configuration database. For each UE ID, the configuration database may include a listing of each possible application, as well as the call types provided by each application.

As shown in FIG. 1, configuration database 130 includes two application types (MC PTT and VoLTE). Both of these application types have emergency and 1:1 call types. The MC PTT application has a broadcast call type as well.

The configuration database may list a priority of each application/call type combination. In some implementations, the priorities may be unique, such that no two application/call type combinations have the same priority. However, this is only one example implementations. As will be explained in further detail below, the techniques described herein would be able to handle cases in which call priorities are the same. As shown in the configuration database 130, the call priority is as follows: MC PTT (emergency)>VoLTE (emergency)>MC PTT (1:1)>MC PTT (Broadcast)>VoLTE (1:1).

Although an example prioritization is shown, it should be understood that the prioritization is completely under the control of the operator of the system 100. The operator may specify any priority order descried. Furthermore, in the example, shown, the priority order can be configured differently for each individual piece of UE 170, such that each piece of UE 170 has its own priority order defined. In other implementations, the index by UE ID may be removed, such that the priority order is the same for every piece of UE 170.

In yet other implementations, the configuration database may have additional levels of indexing. For example, an additional level of indexing based on the calling party UE ID may be used so that the priority order is not only dependent on the application/call type combination, but is also based on the party that is initiating the call. For example, the priority order could be different based on if a coworker is calling or a supervisor is calling.

In yet other implementations, the configuration database could be indexed by any number of other criteria. Some examples, can include a particular talkgroup in use, a specific location of the UE (e.g. proximity to another user/incident), a specific state, a specific role of the user using the UE etc. In some implementations the configuration database could be indexed by a User ID that is associated with an individual user. Indexing by User ID may be useful in cases where the UE are shared between multiple users at different times.

In yet other implementations, there may be another level of indexing related to a device ID of the device the user is using. In some cases, the user may have multiple devices and may be using them concurrently. An index by device ID would allow for different prioritizations for different devices. What should be understood is the priority order is completely configurable by the system operator and is not dependent on the provider of the COTS device. Use of the configuration database is described in further detail with respect to FIG. 2.

In some cases, there is not a one to one relationship between a specific piece of UE (e.g. UE 1 170-1) and a UE ID. For example, each of the multiple applications may use their own UE ID to reference a piece of UE. For example, MC PTT calls may use a UE ID based on an Internet Protocol (IP) address, while VoLTE calls may use a UE ID that is based on something else. AS 125 may be configured to provide a mapping between UE IDs that are used by the various applications. In other words, the UE ID may be a normalized ID between all of the applications and the AS maps the application specific UE ID to the normalized UE ID.

In some implementations, the mapping of application specific UE IDs to the normalized UE ID may be statically configured in the configuration database 130. Upon receipt of a communication using an application specific UE ID, the AS 125 may determine the normalized UE ID by querying the configuration database. In other implementations the mapping may be based on the contents of the call initiation messages. Overall, what should be understood is that the AS 125 is able to determine which, if any, calls a piece of UE is engaged in, regardless of the specific form of UE ID for a specific application.

Although two applications (MC PTT and VoLTE) are shown in the configuration database 130, it should be understood that this is simply for purposes of ease of description and not by way of limitation. An actual implementation is not limited in the number of different applications that can be supported, nor in the number of call types within those applications.

Figure 2:
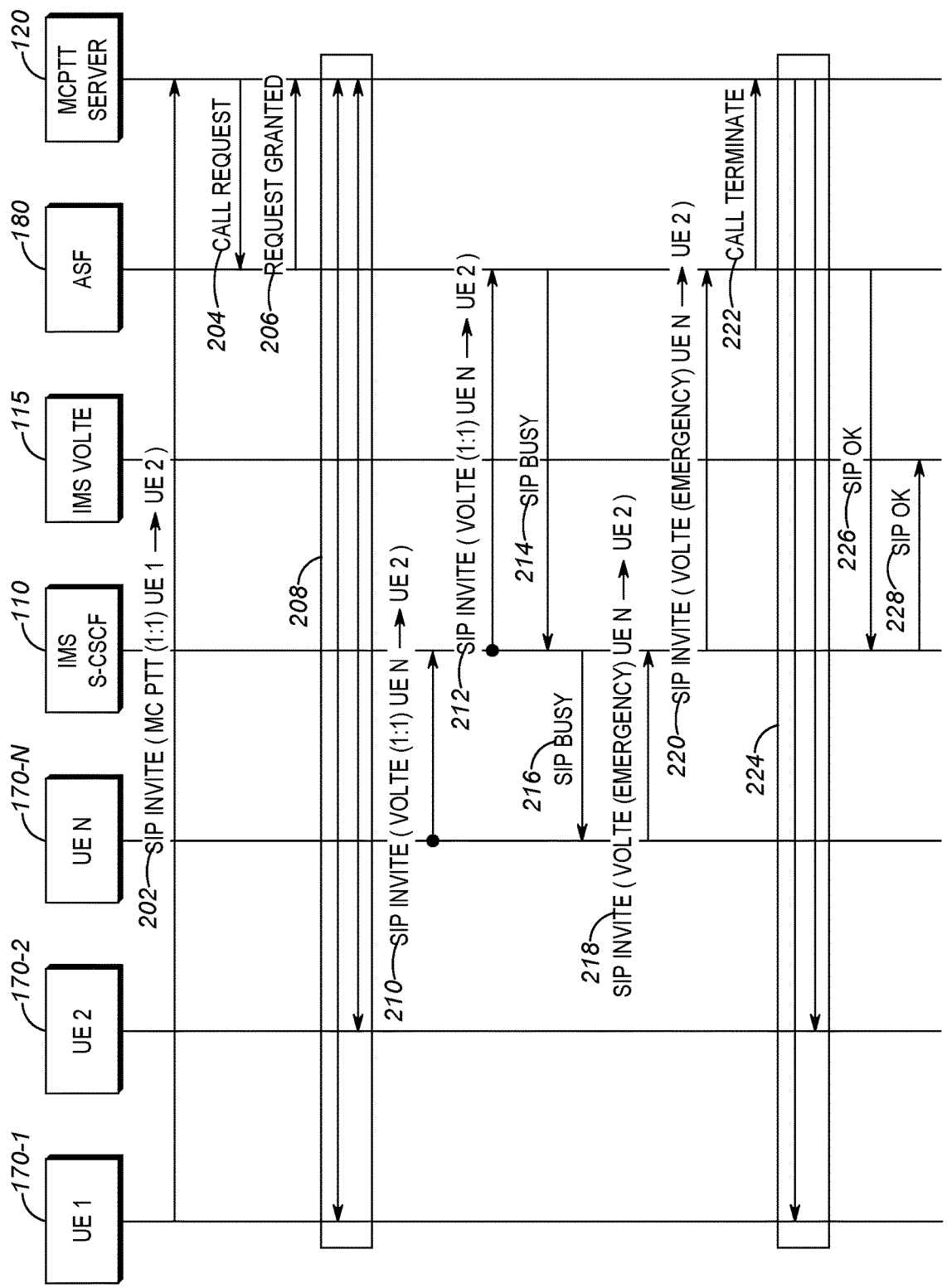
FIG. 2 is an example message sequence diagram showing interactions between the various participants in several call scenarios.

FIG. 2 is an example message sequence diagram showing interactions between the various participants in several call scenarios according to the network architecture described with respect to FIG. 1. Initially, assume that UE 1 wishes to engage in a 1:1 call with UE 2. The process may begin with UE 1 170-1 sending a SIP Invite message 202 to the MC PTT server 120. The SIP Invite message indicates this is a request for a 1:1 call between UE 1 170-1 and UE 2 170-2. In the example presented, the MC PTT call application is not an IMS service. As such, the SIP Invite does not go through the IMS S-CSCF 110.

Upon receipt of the SIP Invite message 202 the MC PTT Server 120 may send a call request message 204 to the ASF 180. The call request message 204 may include the parties to the call (e.g. UE 1, UE 2), the application (e.g. MC PTT), and the call type (e.g. 1:1 call). Assume initially that there are no current calls ongoing in the system, such that the call registry 150 is currently empty.

Upon receipt of the Call request message 204, the ASF 180 may access the call registry database 150 to determine if any parties specified in the call request message 204 are currently involved in a call. If not, the ASF 180 may create entries in the call registry 150 specifying the UE ID of the call participants and the application being used. In addition, the ASF 180 may access the configuration database 130 to determine the priority of the call for the given UE, application, and call type. In the present example, assume that all UE utilize the same call priority such that the entry for every UE in the configuration database 150 is the same. As shown by configuration database 150, the priority for an MC PTT 1:1 call is priority 3. The ASF 180 may then include the call priority in the call registry 150. FIG. 1 shows the status of the call registry once populated with the example call that is associated with call request 204.

The ASF may then send a Request Granted message 206 to the MC PTT Server 120 informing it that the call may be allowed to proceed. The MC PTT sever 120 may then proceed to set up the call between UE 1 and UE 2 in accordance with MC PTT protocols. For purposes of ease of description, those steps are omitted in FIG. 2 and the in progress call is represented by message sequence 208. What should be understood is that once the call request is granted, the call is setup following the normal procedures of the application. This may involve SIP message, some other standard protocol (e.g. SS7, etc.) or a proprietary protocol. The techniques described herein are not dependent on any particular application protocol.

At some point, UE n 170-n may wish to make a VoLTE 1:1 call to UE 2. In the present example the VoLTE application is defined as an IMS application. As such, UE 170-n may send a SIP Invite message to IMS S-CSCF 110 indicating that UE n is attempting to set up a 1:1 VoLTE call with UE 2. The S-CSCF 110 may receive the message 210 and process the message using the iFC. In accordance to the iFC, the SIP Invite message 210 may be forwarded to the ASF 180 as SIP Invite message 212.

Upon receipt of the SIP Invite message 212, the ASF 180 may determine if either UE n or UE 2 is currently involved in a call. As shown, UE 2 is involved in a call, and that call has a priority of 3. The ASF 180 may then access the configuration database 130 to determine the priority of the call that is being requested. In this particular case, the VoLTE 1:1 call has a priority of 5, which is lower than the priority of the call that UE 3 is currently engaged in. The ASF 180 may respond to the IMS S-CSCF with a SIP message indicating the call cannot go through. For example, the ASF 180 may respond with a SIP Busy message 214 to inform the IMS S-CSCF 110 that the call cannot be completed. The IMS S-CSCF may then send the SIP Busy message 216 back to UE 170-n. The user may then be informed that the call could not be completed. In some cases, the user may receive an indication that the call could not be completed because the called party is engaged in a higher priority call.

At some point, UE n 170-n may wish to make a VoLTE emergency call to UE 2. Just as above, UE 170-n may send a SIP Invite message 218 to the IMS S-CSCF 110 to set up a VoLTE emergency call between UE 170-n and UE 170-2. The IMS S-CSCF, using the iFC, may forward the SIP Invite message 220 to the ASF 180. The ASF may then go through the same process described above with respect to the VoLTE 1:1 call, with the difference being that the requested emergency call has a call priority of 2, which is higher than the call priority of the call that UE 2 is currently engaged in.

Because the call priority of the new call to UE 170-2 is greater than the call UE 2 is currently engaged in, the ASF 180 may determine that the in progress call should be terminated. The ASF 180 may send a Call Terminate message 222 to the MC PTT server 120, instructing the server that the call between UE 170-1 and UE 170-2 should be terminated. The MC PTT server 120 may then send messages 224 to UE 170-1 and UE 170-2 informing them that their call is being terminated. It should be noted that the call termination process proceeds in accordance with the normal protocol of the MC PTT application. The techniques described here do not require changes to the application protocols themselves. It should further be understood that when the call is terminated, regardless of if termination is due to a higher priority call or the existing call having ended normally (normal call ending), the information in the call registry for the call will be removed.

Furthermore, it should be noted that in some implementations, termination of the ongoing call does not necessarily mean the ongoing call is completely disconnected. For example, in a Mission Critical Video call (MC Video as defined by 3GPP) there are two data streams: the video stream and the audio stream. If a user is engaged in a MC Video call and a higher priority audio call is received, the audio stream of the MC Video call may be "terminated" by temporarily suspending the audio stream of the MC Video call while the higher priority audio call is in progress. The video stream would continue uninterrupted. Once the higher priority audio call is completed, the audio stream of the MC Video call may be restarted.

Conversely, if an audio call is currently in progress and an MC Video call of lower priority is received, the system may allow the video stream portion of the MC Video call to complete while rejecting the completion of the audio stream. The rejection of the audio stream may comprise temporarily suspending the audio stream of the MC Video call. Once the audio call that is higher priority and currently in progress ends, the audio stream of the MC video call may be allowed to complete.

Suspending and/or queueing a call is not restricted to cases such as MC Video calls that have separate streams. In a case where a call is in progress and a higher priority call comes in, the lower priority call may be terminated by temporarily suspending the lower priority call. Once the higher priority call has completed, the lower priority call can be unsuspended and rejoin the lower priority call. In the case of a group call, although the user may have missed the conversation that occurred while taking part in the higher priority call, the user is at least able to rejoin the lower priority call.

Similarly, if a user is engaged in a higher priority call and a lower priority call comes in, the lower priority call may be rejected. However, the lower priority call may be placed in a queue. Once the higher priority call completes, the user may be joined to the in-progress lower priority call. Just as above, the user may miss a portion of the conversation of the lower priority call that occurred while he was engaged in the higher priority call, the user will at least not completely miss the lower priority call.

The ASF 180 may delete the information related to UE 170-1 and 170-2 from the call registry 150 once the call between those two entities has been completed. The ASF 180 may then create entries (not shown) in the call registry 150 for the emergency VoLTE call between UE 170-n and UE 170-2. The ASF 180 may then send a message to the IMS S-CSCF, such as a SIP OK message 226 indicating that the emergency call may proceed. The IMS S-CSCF may then inform the IMS VoLTE server 115 via a SIP OK 228 that a call should be set up between UE 170-n and UE 170-2 using the normal protocol (not shown). From the perspective of the VoLTE application, it need not be aware of any of the processing that has occurred prior, and simply causes the call to be set up as defined by the protocol.

It should be noted that there is the possibility that a UE may be engaged in a current call and a request for a new call using the same application and call type as the current call is received. In such cases, both the new and current calls may have the same priority. The network operator may choose to reject new calls that have the same priority as a current call or terminate the current call when a new call of the same priority is received. The behavior in the case of equal priority may be configured by the network operator. Furthermore, this enables the network operator to also allow calls from different applications to have the same priority. The techniques described herein are not limited to having unique priorities for every application/call type combination.

It should also be noted that although the example in FIG. 2 is generally described with respect to SIP signaling, the techniques described herein are in no way limited to SIP signaling. The techniques may be utilized with any other protocol. What should be understood is that call priority is determined based on an operator configurable database that takes into account, at minimum, the call application and call type within that application. These combinations are given a priority and it is that priority that determines which calls are allowed and which calls are rejected. It should be further understood that the priorities are not based solely on application, but rather take into account call type as well.

Figure 3:
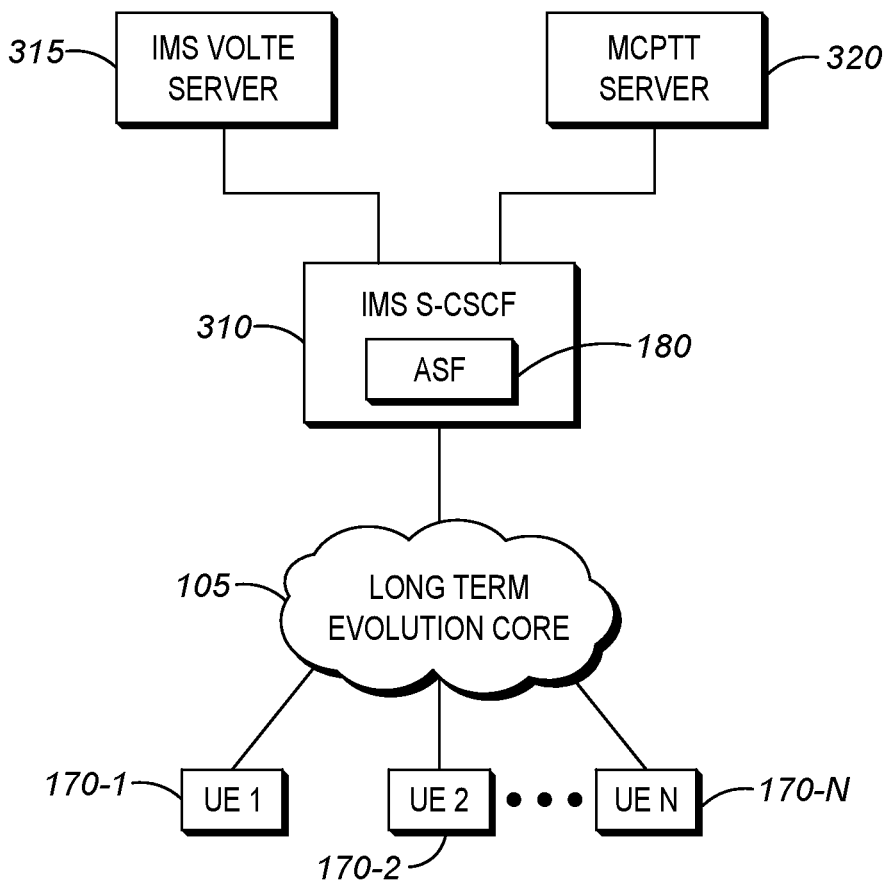
FIG. 3 is a block diagram of an example system that may implement the resource arbitration for commercial off the shelf phones techniques described herein when the arbitration server is integrated within the functionality provided by another service.

FIG. 3 is a block diagram of an example system that may implement the resource arbitration for commercial off the shelf phones techniques described herein when the arbitration server function is integrated within the functionality provided by another service. Similar to system 100, system 300 may include UE 170-1 . . . n and LTE Core 105.

System 300 may also include IMS S-CSCF 310. The IMS S-CSCF 310 may perform the same functions with respect to call processing as the IMS S-CSCF 110 described with respect to FIG. 1. However, IMS S-CSCF 310 may also include the ASF 180 functionality (e.g. arbitration server, call registry, configuration database) that was described FIG. 1. In some implementations, the ASF 180 function may simply run on the same computing hardware as the IMS S-CSCF 310 and would behave as a separate process. For example, the process of sending call initiation messages to the ASF 180 would be performed using the iFC as described above.

In other implementations, the ASF 180 functionality may be integrated with the S-CSCF functionality. Thus, when a call initiation message is received (e.g. SIP Invite) the determination of call priority may be performed as part of the SIP Invite processing, rather than being sent to another process via the iFC.

System 300 also shows an implementation where both the IMS VoLTE server 315 and the MC PTT server 320 are implemented as IMS services. Because these applications are implemented directly as IMS applications, there is no need for the applications to be modified to send call initiation requests to the arbitration server. Processing the call origination requests by the ASF 180 would simply follow the process of all IMS applications.

What should be understood is that the techniques described herein are not dependent on any particular network architecture. The techniques described herein are usable with any network topology, so long as an ASF 180 is provided and participates in the call set up process. The various entities described (e.g. LTE Core, IMS system, application servers, etc.) need not all be under the same owner ship/control. The various parts of the network could be independently owned and operated. Furthermore, the techniques described do not require that the UE have any special software/a hardware and the system is operable using any COTS device without any modification.

Figure 4:
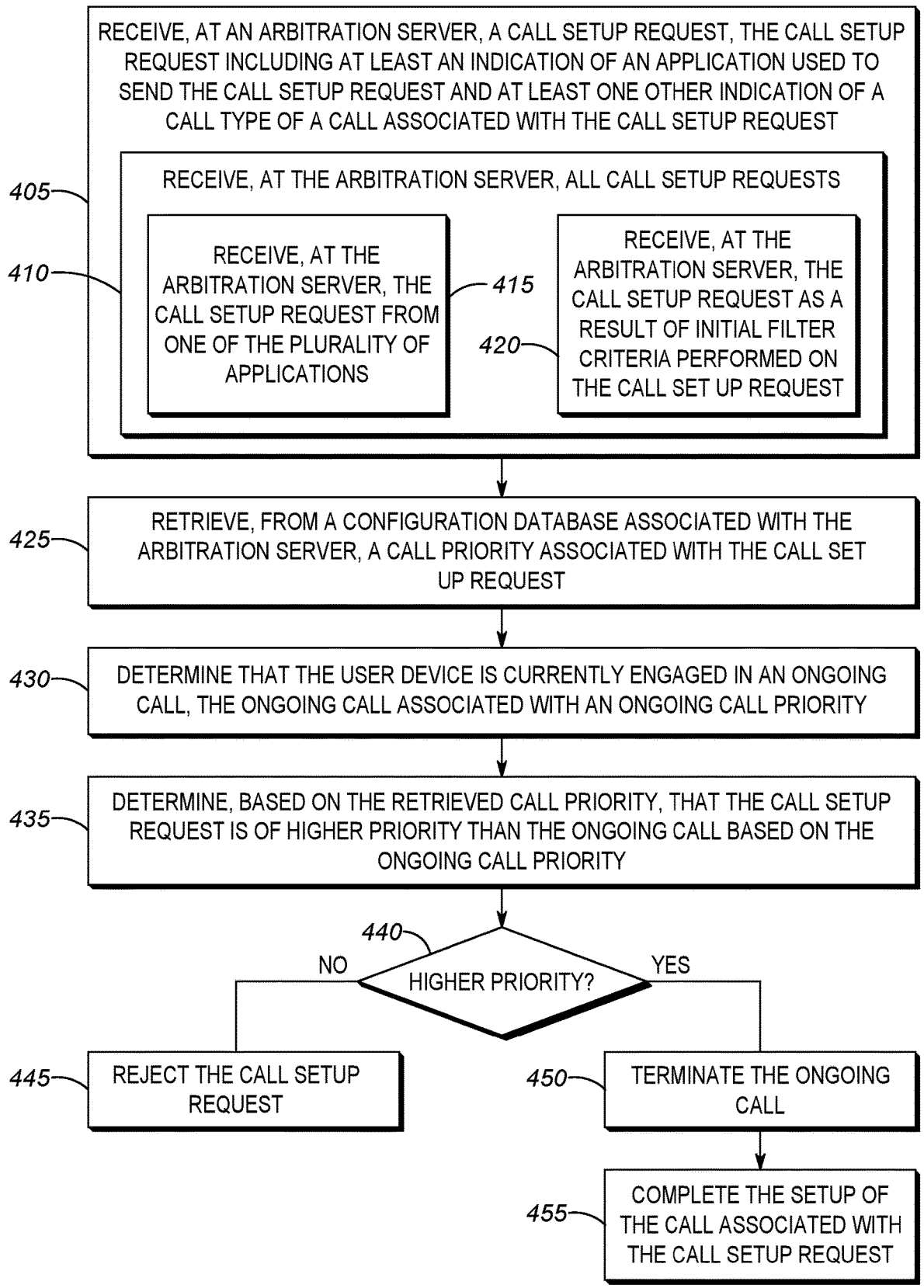
FIG. 4 is an example of a flow diagram for implementing the resource arbitration for commercial off the shelf phones techniques described herein.

FIG. 4 is an example of a flow diagram for implementing the resource arbitration for commercial off the shelf phones techniques described herein. One example resource may include a microphone. However, techniques described herein are not limited to microphones. The techniques described herein are suitable for any resource that is limited to use by one application at a time such as a camera for ViLTE or MCVideo calls. In block 405, a call setup request may be received at an arbitration server. The call setup request may include at least an indication of an application used to send the call setup request and at least one other indication of a call type of a call associated with the call setup request. As explained with respect to FIG. 2, the process may begin with a call setup request being received by the arbitration server. The call setup request may include the application of a plurality of applications that may initiate the call set up request as well as a call type associated with the call setup request.

A non-exhaustive list of possible applications may include Voice Over Long Term Evolution (VoLTE), Video Over Long Term Evolution (ViLTE), Mission Critical Push to Talk (MCPTT), Mission Critical Video (MCVideo), and Voice Over Internet Protocol (VoIP) Secure VoIP (SVoIP). However, it should be understood that the techniques described herein are not limited to any particular type of application and are usable with any current or future developed calling application. Examples of call types may include emergency calls, 1:1 calls, broadcast calls, multicast calls, etc. The techniques described herein are not limited to any particular call types and are suitable for use with any call type.

In box 410, the arbitration server may receive all call setup requests. As explained above with respect to FIG. 2, the arbitration server determines if a new call request is associated with a user that is currently involved in a call. In order to make this determination, the arbitration server needs to be aware of all call setup requests. In some implementations, the arbitration server may be a standalone device. An example of a hardware device that may implement an arbitration server is described in FIG. 5. In other implementations, the arbitration server function is integrated with functionality provided by some other network element. For example, the arbitration server function may be integrated with the S-CSCF.

In block 415, the arbitration server may receive the call setup request from one of the plurality of applications. As explained above, for a non-IMS based call application, the initial call setup request may go from the UE directly to the application server, bypassing the S-CSCF. In such cases, the application itself may forward the call setup request to the arbitration server in order to determine if the new call setup request is allowed to proceed.

In block 420, the arbitration server may receive the call setup request as a result of initial filter criteria. As explained above, the 3GPP has defined iFC that allows call setup request messages to be intercepted for further processing prior to setting up the call. For IMS based applications, the iFC may cause the initial call setup request to be forwarded to the arbitration server to determine if the call is allowed to proceed.

In block 425, a call priority associated with the call setup request may be retrieved form a configuration database associated with the arbitration server. As explained with respect to FIGS. 1 and 2, every combination of calling application and call type is associated with a priority. The priorities may be stored in a configuration database. The priorities can be set by the system operator and are entirely independent to the User Equipment. Because these priorities are independent of the user equipment, any commercially available off the shelf device is suitable for use with the techniques described herein.

In block 430, it may be determined that the user device is currently engaged in an ongoing call, the ongoing call associated with an ongoing call priority. As explained above, whenever a piece of UE engages in a call, a call registry stores the identifier of the UE, and information related to the priority of the ongoing call. This priority may then be used to determine if new call request should be allowed to complete or should be rejected.

In block 435 it may be determined, based on the retrieved call priority that the call setup request is of higher priority than the ongoing call based on the ongoing call priority. In essence, this means that the new incoming call is of higher priority than the currently ongoing call which currently has the resource (e.g. microphone) occupied. In block 440, if it determined that the new call setup request is not of higher priority than the ongoing call, the process moves to block 445. In block 445, the call setup request is rejected. In other words, the ongoing call, is entitled to use the resource, and as such should not be disturbed. In some implementations, rejecting the call setup request may include sending a notification to the application server that is initiating the call setup request, informing it that the call should be rejected.

If the new call request is of higher priority than the ongoing call request, the process moves to block 450. In block 450, the ongoing call is terminated. In some implementations, terminating the ongoing call may include sending a notification to the application server that is involved in the ongoing call, the notification including instructions to terminate the ongoing call. In some implementations, termination of the ongoing call may include completely ending the ongoing call.

In other implementations, terminating the ongoing call temporarily suspends the ongoing call until the higher priority call is completed. At that point, the terminated call can be reconnected. What should be understood is that regardless of how implemented, the termination of the ongoing call frees up the resource (e.g. microphone) for use by the higher priority call request. In block 455 the setup of the call associated with the call setup request is completed. The call setup process follows the normal procedure for call setup and is not impacted by the techniques described herein.

Figure 5:
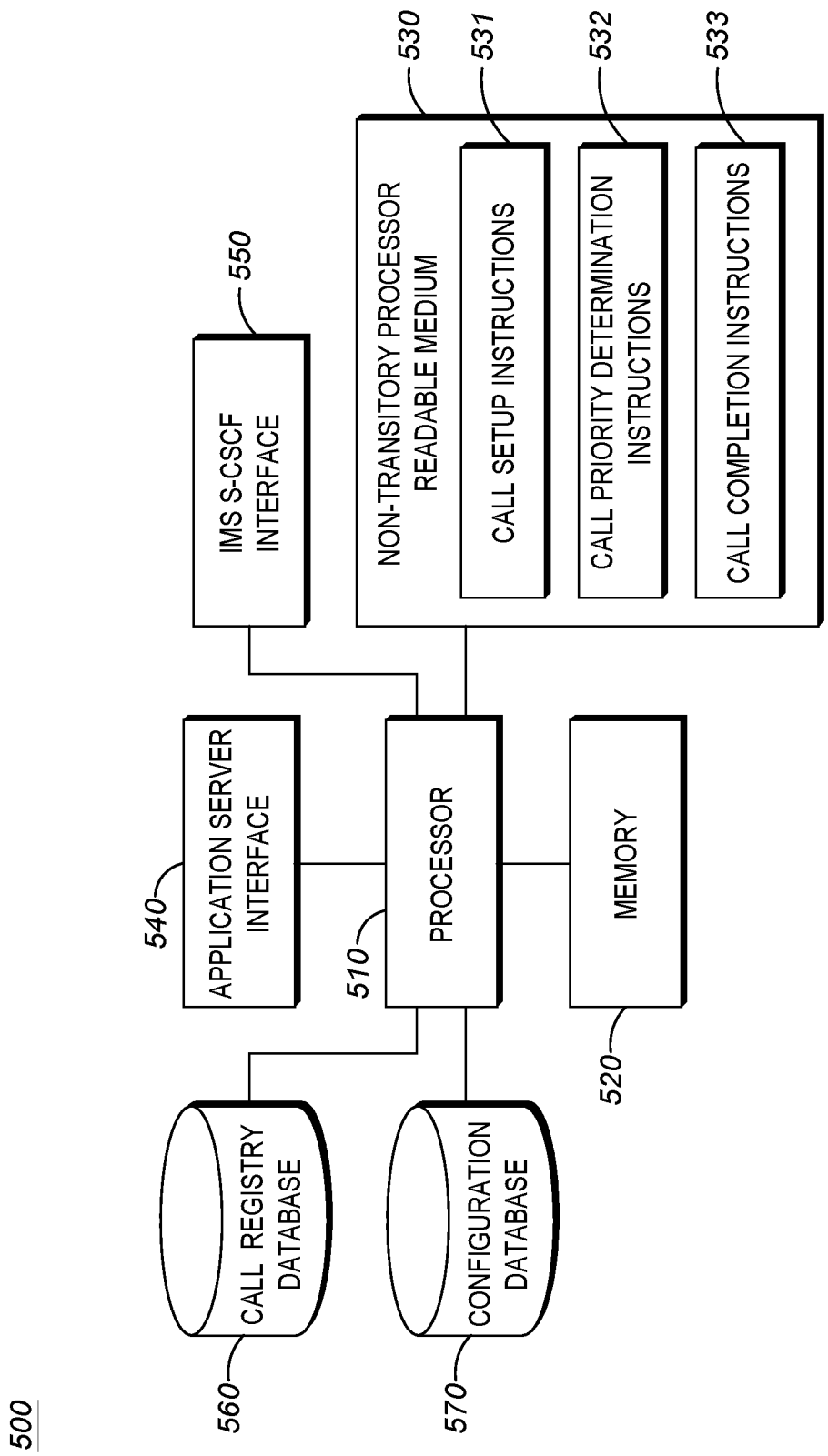
FIG. 5 is an example of a device and a non-transitory computer readable medium that may implement the resource arbitration for commercial off the shelf phones techniques described herein.

FIG. 5 is an example of a device and a non-transitory computer readable medium that may implement the resource arbitration for commercial off the shelf phones techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, audio analytics, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, application server interface 540, IMS S-CSCF interface 550, call registry database 560, and configuration database 570.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include call setup instructions 531. The call setup instructions 531 may cause the processor to monitor a new call set up request. In the case of a IMS based application, the new call setup request may be received from the IMS S-CSCF via the IMS S-CSCF interface. For example, the iFC on the IMS S-CSCF may cause all IMS call setup requests to be sent initially to processor 510. In the case of non-IMS call applications, the call setup request may be received directly form the call application via the application server interface 540. The call setup instructions 531 are described throughout this description generally, including places such as the description of blocks 405-420.

The medium 530 may include call priority determination instructions 532. The call priority determination instructions 532 may cause the processor 510 to determine the priority associated with the new call setup request. For example, the call priority determination instructions 532 may cause the processor 510 to access a configuration database 570 to determine the priority of the new call set up request based on the application that is being used for the new call as well as the call type of the new call.

The call priority determination instructions 532 may also cause the processor 510 to determine if the UE is currently engaged in an ongoing call. For example, the processor 510 may access the call registry database 560 to determine if the UE is associated with an ongoing call. If so, the priority of the ongoing call may be retrieved from the call registry database 570. The call priority determination instructions 532 instructions are described throughout this description generally, including places such as the description of block 435.

The medium 530 may include call completion instructions 533. The call completion instructions 533 may cause the processor 510 to either accept or reject the new call setup request based on the priority determination. For example, if the new call setup request is of lower priority than an ongoing call, the processor 510 may reject the new call setup request. If the new call setup request is of greater priority than the ongoing call, the processor 510 may terminate the ongoing call and allow the new call setup request to proceed. The call completion instructions 533 instructions are described throughout this description generally, including places such as the description of blocks 440-455.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for resource arbitration for a user device including a plurality of applications comprising:
   receiving, at an arbitration server, a call setup request, the call setup request including at least an indication of an application used to send the call setup request and at least one other indication of a call type of a call associated with the call setup request;
   retrieving, from a configuration database associated with the arbitration server, a call priority associated with the call set up request;
   determining, based on a call registry associated with the arbitration server, that the user device is currently engaged in an ongoing call and that the ongoing call has an ongoing call priority corresponding to an identifier of the user device according to the call registry,
   determining, via the arbitration server, that the ongoing call uses a physical resource of the user device for a mission critical communication and is associated with the ongoing call priority,
   determining, based on the retrieved call priority, that the call setup request is of higher priority than the ongoing call based on the ongoing call priority; and
   when the call setup request is of higher priority:
     terminating the ongoing call; and
     completing, the setup of the call associated with the call setup request.

2. The method of claim 1 further comprising:
   updating the call registry based on completion of the ongoing call; and
   wherein completing the setup of the call comprises not preempting the ongoing call when one of a video stream or an audio stream is not required.

3. The method of claim 1 further comprising:
   when the call setup request is not of higher priority:
     rejecting the call setup request.

4. The method of claim 1 further comprising:
   receiving, at the arbitration server, the call setup request as a result of initial filter criteria performed on the call set up request.

5. The method of claim 1 further comprising:
   receiving, at the arbitration server, the call setup request from one of the plurality of applications.

6. The method of claim 1 further comprising;
   receiving, at the arbitration server, all call setup requests.

7. The method of claim 1 wherein the call priority is based on the application of the plurality of applications and a call type associated with the call set up request.

8. The method of claim 1 wherein the plurality of applications includes at least one of:
   Voice Over Long Term Evolution (VoLTE);
   Video Over Long Term Evolution (ViLTE);
   the MCPTT;
   Mission Critical Video (MCVideo);
   Voice Over Internet Protocol (VoIP); and
   Secure VoIP (SVoIP).

9. The method of claim 1 wherein the arbitration server is a standalone server.

10. The method of claim 1 wherein the arbitration server is integrated within a Internet Multimedia Subsystem (IMS) Serving Call Setup and Control Function (S-CSCF).

11. A non-transitory processor readable medium containing a set of instructions thereon that when executed by a processor cause the processor to:
    receive, at an arbitration server, a call setup request, the call setup request including at least an indication of an application used to send the call setup request and at least one other indication of a call type of a call associated with the call setup request;
    determining, based on the call setup request, that the application requires use of a microphone or camera of a user device;
    retrieve, from a configuration database associated with the arbitration server, a call priority associated with the call set up request;
    determine, based on a call registry associated with the arbitration server, that the user device is currently engaged in an ongoing call and that the ongoing call has an ongoing call priority corresponding to an identifier of the user device according to the call registry;
    determine, via the arbitration server, that the ongoing call uses a physical resource of the user device for a mission critical communication;
    determine, based on the retrieved call priority, that the call setup request is of higher priority than the ongoing call based on the ongoing call priority; and
    when the call setup request is of higher priority:
      terminate the ongoing call; and
      complete the setup of the call associated with the call setup request.

12. The medium of claim 11 further comprising instructions to:
    when the call setup request is not of higher priority:
      reject the call setup request.

13. The medium of claim 11 further comprising instructions to:
    receive, at the arbitration server, the call setup request as a result of initial filter criteria performed on the call set up request.

14. The medium of claim 11 further comprising instructions to:
    receive, at the arbitration server, the call setup request from one of a plurality of applications.

15. The medium of claim 11 further comprising instructions to:
    receive, at the arbitration server, all call setup requests.

16. A system comprising:
    a processor; and
    a memory coupled to the processor, the memory containing a set of instructions thereon that when executed by the processor cause the processor to:

receive, at an arbitration server, a call setup request, the call setup request including at least an indication of an application used to send the call setup request and at least one other indication of a call type of a call associated with the call setup request;

retrieve, from a configuration database associated with the arbitration server, a call priority associated with the call set up request;

determine, based on a call registry associated with the arbitration server, that a user device is currently engaged in an ongoing call and that the ongoing call has an ongoing call priority corresponding to an identifier of the user device according to the call registry;

determine, via the arbitration server, that the ongoing call uses a physical resource of the user device for a mission critical communication;

determine, based on the retrieved call priority, that the call setup request is of higher priority than the ongoing call based on the ongoing call priority; and when the call setup request is of higher priority:
terminate the ongoing call; and
complete the setup of the call associated with the call setup request.

17. The system of claim 16 wherein the memory further comprises instructions to:
when the call setup request is not of higher priority:
reject the call setup request.

18. The system of claim 16 wherein the memory further comprises instructions to:
receive, at the arbitration server, the call setup request as a result of initial filter criteria performed on the call set up request.

19. The system of claim 16 wherein the memory further comprises instructions to:
receive, at the arbitration server, the call setup request from one of a plurality of applications.

20. The system of claim 16 wherein the memory further comprises instructions to:
receive, at the arbitration server, all call setup requests.

* * * * *